United States Patent
Holtom

(10) Patent No.: US 8,112,465 B2
(45) Date of Patent: Feb. 7, 2012

(54) SYSTEM, DEVICE, AND METHOD FOR VALIDATING DATA STRUCTURES IN A STORAGE SYSTEM

(75) Inventor: John C. Holtom, Sunnyvale, CA (US)

(73) Assignee: BlueArc UK Limited, Bracknell, Berkshire (GB)

( * ) Notice: Subject to any disclaimer, the term of this patent is extended or adjusted under 35 U.S.C. 154(b) by 624 days.

(21) Appl. No.: 12/248,300

(22) Filed: Oct. 9, 2008

(65) Prior Publication Data

US 2009/0100110 A1 Apr. 16, 2009

Related U.S. Application Data

(60) Provisional application No. 60/979,561, filed on Oct. 12, 2007.

(51) Int. Cl.
G06F 12/00 (2006.01)
(52) U.S. Cl. .................. 707/823; 711/100; 714/747
(58) Field of Classification Search .................. 714/747; 707/823
See application file for complete search history.

(56) References Cited

U.S. PATENT DOCUMENTS

| | | | | |
|---|---|---|---|---|
| 5,819,292 | A | 10/1998 | Hitz et al. | 707/203 |
| 7,293,154 | B1 * | 11/2007 | Karr et al. | 711/202 |
| 7,603,397 | B1 * | 10/2009 | Hagerstrom et al. | 1/1 |
| 2002/0161982 | A1 * | 10/2002 | Riedel | 711/170 |
| 2003/0182301 | A1 | 9/2003 | Patterson et al. | 707/200 |
| 2004/0088608 | A1 * | 5/2004 | Nguyen et al. | 714/49 |
| 2005/0097141 | A1 | 5/2005 | Loafman et al. | 707/200 |
| 2007/0067256 | A1 * | 3/2007 | Zayas et al. | 707/1 |
| 2007/0266066 | A1 * | 11/2007 | Kapoor et al. | 707/205 |

FOREIGN PATENT DOCUMENTS

WO 03/105026 12/2003

OTHER PUBLICATIONS leen Frish, Essential System Administration, Third Edition, 2002, pp. 1-24.*
Linux Filesystems, 2002, pp. 17-22 and 67-71.*
International Searching Authority, International Search Report, International Application No. PCT/US2008/079308, dated Sep. 17, 2009, together with the Written Opinion of the International Searching Authority, 17 pages.

* cited by examiner

*Primary Examiner* — John E Breene
*Assistant Examiner* — Albert Phillips, III
(74) *Attorney, Agent, or Firm* — Sunstein Kann Murphy & Timbers LLP

(57) ABSTRACT

Validating a data structure includes (a) maintaining a tracking structure in a memory, the tracking structure including a corresponding status field for each table entry, the status fields having an unmarked state and a marked state; (b) processing the table entries sequentially and tracking the used and free table entries using the tracking structure, such tracking including marking the status fields corresponding to used table entries and marking the status fields corresponding to the next free table entries referenced in the pointer fields of free table entries; and (c) determining validity of the data structure based on the tracking structure.

24 Claims, 8 Drawing Sheets

```
initialize bitmap
for (i = 1 to Z)
    if (table[i].type = "used")
        if (bitmap[i] is already marked)
            return error - indirection object is corrupted
        else
            mark bitmap[i]
        endif
    else
        j = table[i].pointer
        if (j != 0)
            if (bitmap[j] is already marked)
                return error - indirection object is corrupted
            else
                mark bitmap[j]
            endif
        endif
    endif
endfor
if (table[DSB.listA].type != "free" or table[DSB.listB].type != "free")
    return error – indirection object is corrupted
elseif (bitmap[DSB.listA] or bitmap[DSB.listB] is already marked)
    return error - indirection object is corrupted
else
    mark bitmap[DSB.listA] and bitmap[DSB.listB]
endif
if (any other bit in the bitmap is unmarked)
    return warning – indirection object is usable
else
    return good – indirection object is valid
endif
```

1
J
System Objects
---
K
Z
File Objects
*Fig. 4*

```
initialize bitmap
for (i = 1 to Z)
        if (table[i].type = "used")
                if (bitmap[i] is already marked)
                        return error - indirection object is corrupted
                else
                        mark bitmap[i]
                endif
        else
                j = table[i].pointer
                if (j != 0)
                        if (bitmap[j] is already marked)
                                return error - indirection object is corrupted
                        else
                                mark bitmap[j]
                        endif
                endif
        endif
endfor
if (table[DSB.listA].type != "free" or table[DSB.listB].type != "free")
        return error – indirection object is corrupted
elseif (bitmap[DSB.listA] or bitmap[DSB.listB] is already marked)
        return error - indirection object is corrupted
else
        mark bitmap[DSB.listA] and bitmap[DSB.listB]
endif
if (any other bit in the bitmap is unmarked)
        return warning – indirection object is usable
else
        return good – indirection object is valid
endif
```

*Fig. 7*

SYSTEM, DEVICE, AND METHOD FOR VALIDATING DATA STRUCTURES IN A STORAGE SYSTEM

CROSS-REFERENCE TO RELATED APPLICATION

This patent application claims priority from U.S. Provisional Patent Application No. 60/979,561 entitled SYSTEM, DEVICE, AND METHOD FOR VALIDATING DATA STRUCTURES IN A STORAGE SYSTEM filed on Oct. 12, 2007 in the name of John C. Holtom, which is hereby incorporated herein by reference in its entirety.

FIELD OF THE INVENTION

The present invention relates to data storage systems, and in particular to validating certain data or file structures in a data storage system.

BACKGROUND OF THE INVENTION

Various types of objects may be stored in a data storage system. For example, in a file storage system, a file server may store various types of system objects (e.g., a root directory object, a free block bitmap object, etc.) as well as various types of user objects (e.g., user data files). Objects may be stored using tree structures having a root node that points to various other structures, such as storage blocks that contain content, direct nodes that point to storage blocks, or indirect nodes that point to other indirect nodes or to direct nodes. Among other things, tree structures allow objects to expand and contract, e.g., by respectively adding and removing nodes. Ultimately, objects are stored in one or more storage devices, such as disk drives.

One type of object that may be used in a data storage system is an indirection object that provides pointers to the root nodes of the various objects stored in the storage system. The indirection object may be logically organized as a table that can be indexed by object number in order to access, among other things, a pointer to the root node of the corresponding object. Like other objects, the indirection object may be stored using a tree structure and therefore can expand as more objects are created in the storage system.

In order to prevent the indirection object from expanding unnecessarily, the object numbers of deleted objects (and therefore the corresponding table entries in the indirection object) may be re-used as new objects are added to the storage system. Thus, a list of available object numbers is typically maintained in the storage system. For various reasons, it may be necessary or desirable to verify the indirection object, including the list of available object numbers, from time to time in order to ensure that all free object numbers are included in the free object number list and that no "used" object numbers are included in the free object number list.

SUMMARY OF THE INVENTION

Certain embodiments of the present invention relate to validation of a data structure comprising a table having a sequence of table entries, each table entry including a type field and a pointer field, the type field indicating whether the table entry is used or free, the pointer field including a reference to a next free table entry if the table entry is free such that the data structure includes a list of free table entries linked using pointer fields.

In accordance with one aspect of the invention there is provided a method for validating such a data structure in a storage system. The method involves (a) maintaining a tracking structure in a memory, the tracking structure including a corresponding status field for each table entry, the status fields having an unmarked state and a marked state; (b) processing the table entries sequentially and tracking the used and free table entries using the tracking structure, such tracking including marking the status fields corresponding to used table entries and marking the status fields corresponding to the next free table entries referenced in the pointer fields of free table entries; and (c) determining validity of the data structure based on the tracking structure.

In accordance with another aspect of the invention there is provided apparatus that provides for validation of a data structure in a storage system. The apparatus includes table entry processing logic configured to process the table entries sequentially and track the used and free table entries using a tracking structure, the tracking structure including a corresponding status field for each table entry, the status fields having an unmarked state and a marked state, such processing and tracking including marking the status fields corresponding to used table entries and marking the status fields corresponding to the next free table entries referenced in the pointer fields of free table entries; and validation logic configured to determine validity of the data structure based on the tracking structure.

In accordance with another aspect of the invention there is provided a system that provides for validation of a data structure. The system includes a memory in which a tracking structure is maintained, the tracking structure including a corresponding status field for each table entry, the status fields having an unmarked state and a marked state; and a validator configured to process the table entries sequentially and track the used and free table entries using the tracking structure, such processing and tracking including marking the status fields corresponding to used table entries and marking the status fields corresponding to the next free table entries referenced in the pointer fields of free table entries, the validator further configured to determine validity of the data structure based on the tracking structure.

In various embodiments of the present invention, the tracking structure may be a bitmap, an array, a table, or another appropriate tracking structure. Processing each table entry may involve determining whether the table entry is used or free based on the type field; if the table entry is used and the corresponding status field in the tracking structure is marked, outputting an error indication indicating that the data structure is corrupted; if the table entry is used and the corresponding status field in the tracking structure is unmarked, marking such status field in the tracking structure; if the table entry is free and the status field corresponding to the next free table entry referenced in the pointer field of the table entry is marked, outputting an error indication indicating that the data structure is corrupted; and if the table entry is free and the status field corresponding to the next free table entry referenced in the pointer field of the table entry is unmarked, marking such status field in the tracking structure. After the table entries have been sequentially processed, an error indication may be output if the tracking structure includes any erroneous unmarked status entries. The list of free table entries may be non-circular or circular. The data structure may include a plurality of free table entries lists. The data structure may be a filesystem indirection object.

BRIEF DESCRIPTION OF THE DRAWINGS

The foregoing features of the invention will be more readily understood by reference to the following detailed description, taken with reference to the accompanying drawings, in which:

FIG. 4 shows a representation of object number assignments for an exemplary embodiment of the present invention;

FIG. 7 is a logic flow diagram showing exemplary high-level pseudo-code for validating the indirection object in accordance with an exemplary embodiment of the present invention.

DETAILED DESCRIPTION OF SPECIFIC EMBODIMENTS

Figure 1:
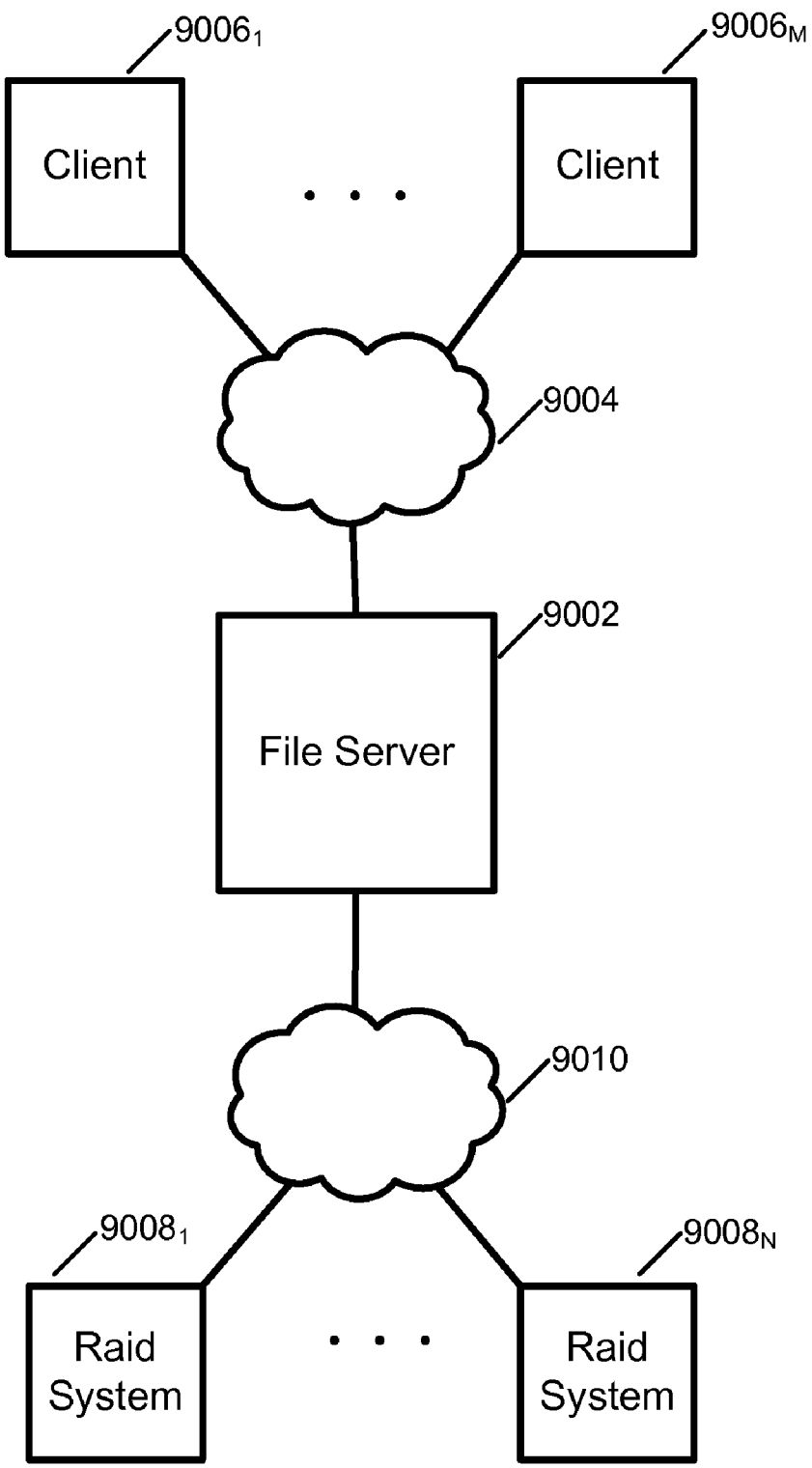
FIG. 1 is a schematic block diagram of a file storage system in accordance with an exemplary embodiment of the present invention.

Definitions. As used in this description and the accompanying claims, the following terms shall have the meanings indicated, unless the context otherwise requires:

A "storage device" is a device or system that is used to store data. A storage device may include one or more magnetic or magneto-optical or optical disk drives, solid state storage devices, or magnetic tapes. For convenience, a storage device is sometimes referred to as a "disk" or a "hard disk." A data storage system may include the same or different types of storage devices having the same or different storage capacities.

A "RAID controller" is a device or system that combines the storage capacity of several storage devices into a virtual piece of storage space that may be referred to alternatively as a "system drive" ("SD"), a "logical unit" ("LU" or "LUN"), or a "volume." Typically, an SD is larger than a single storage device, drawing space from several storage devices, and includes redundant information so that it can withstand the failure of a certain number of disks without data loss. In exemplary embodiments, each SD is associated with a unique identifier that is referred to hereinafter as a "logical unit identifier" or "LUID," and each SD will be no larger than a predetermined maximum size, e.g., 2 TB-64 TB or more. When commands are sent to an SD, the RAID controller typically forwards the commands to all storage devices of the SD at the same time. The RAID controller helps to overcome three of the main limitations of typical storage devices, namely that the storage devices are typically the slowest components of the storage system, they are typically the most likely to suffer catastrophic failure, and they typically have relatively small storage capacity.

A "RAID system" is a device or system that includes one or more RAID controllers and a number of storage devices. Typically, a RAID system will contain two RAID controllers (so that one can keep working if the other fails, and also to share the load while both are healthy) and a few dozen storage devices. In exemplary embodiments, the RAID system is typically configured with between two and thirty-two SDs. When a file server needs to store or retrieve data, it sends commands to the RAID controllers of the RAID system, which in turn are responsible for routing commands onwards to individual storage devices and storing or retrieving the data as necessary. With some RAID systems, mirror relationships can be established between SDs such that data written to one SD (referred to as the "primary SD") is automatically written by the RAID system to another SD (referred to herein as the "secondary SD" or "mirror SD") for redundancy purposes. The secondary SD may be managed by the same RAID system as the primary SD or by a different local or remote RAID system. Mirroring SDs effectively provides RAID 1+0 functionality across SDs in order to provide recovery from the loss or corruption of an SD or possibly even multiple SDs in some situations.

A "filesystem" is a structure of files and directories (folders) stored in a file storage system. Within a file storage system, filesystems are typically managed using a number of virtual storage constructs, and in exemplary embodiments, filesystems are managed using a hierarchy of virtual storage constructs referred to as ranges, stripesets, and spans. A "range" is composed of either a primary SD on its own or a primary/secondary SD pair that are supposed to contain identical data and therefore offer the same storage capacity as a single SD. A "stripeset" is composed of one or more ranges. A "span" is composed of one or more stripesets. Thus, a span is ultimately composed of one or more SDs (typically four to fifty SDs). A span can be divided into one or more filesystems, with each filesystem having a separate name and identifier and potentially different characteristics (e.g., one filesystem may be formatted with 32 KB clusters and another with 4 KB clusters, one filesystem may be Worm and another not, etc.). Each filesystem on the span is formatted, mounted, and unmounted separately. Filesystems may be created and deleted in any order and at any time. Filesystems can be configured to expand automatically (or alternatively to prevent or restrict auto-expansion) or can be expanded manually.

An "object" is a unit of information stored in a data storage system. In the context of a filesystem, objects may include system objects (e.g., a root directory object, a free block bitmap object) as well as file objects (e.g., user file objects). An object may be implemented using a tree structure having a root node that points to various other structures, such as storage blocks that contain content, direct nodes that point to storage blocks, or indirect nodes that point to other indirect nodes or to direct nodes. Ultimately, objects are stored in one or more storage devices, such as disk drives.

A "set" of values may include one or more values.

FIG. 1 is a schematic block diagram of a file storage system in accordance with an exemplary embodiment of the present invention. Among other things, the file storage system includes a number of file servers (a single file server 9002 is shown for the sake of simplicity and convenience) in communication with various client devices $9006_1$-$9006_M$ over a communication network 9004 such as an Internet Protocol network (e.g., the Internet) and also in communication with various RAID systems $9008_1$-$9008_N$ over a storage network 9010 such as a FibreChannel network. The client devices $9006_1$-$9006_M$ and the file server 9002 communicate using one or more network file protocols, such as CIFS and/or NFS. The file server 9002 and the RAID systems 9008₁-9008ₙ communicate using a storage protocol, such as SCSI. It should be noted that the file storage system could include multiple file servers and multiple RAID systems interconnected in various configurations, including a full mesh configuration in which any file server can communicate with any RAID system over a redundant and switched FibreChannel network.

The file server 9002 manages one or more filesystems. The file server 9002 can be configured to allow client access to portions of the filesystems, such as trees or sub-trees under designated names. In CIFS parlance, such access may be referred to as a "share" while in NFS parlance, such access may be referred to as an "export."

Each RAID system 9008 typically includes at least one RAID controller (and usually two RAID controllers for redundancy) as well as a number of physical storage devices (e.g., disks) that are managed by the RAID controller(s). The RAID system 9008 aggregates its storage resources into a number of SDs. For example, each RAID system 9008 may be configured with between 2 and 32 SDs. Each SD may be limited to a predetermined maximum size (e.g., 2 TB-64 TB or more). Combining several storage devices into an SD can provide a number of benefits, including increased speed (individual storage devices are relatively slow, but data can be striped across several storage devices to widen the bottleneck), increased capacity (individual storage devices are comparatively small, but several storage devices can be combined to provide more usable space), abstraction (the amount of space used can be either larger or smaller than the size of a single storage device), and resilience (parity or redundancy information can be stored on each storage device so that the SD can withstand the loss of a storage device).

The file server 9002 is configured to use one or more SDs, which can be from a single RAID system or from multiple RAID systems. The file server 9002 can normally interrogate the RAID systems to find out whether each SD is primary or secondary. The method of controlling which SDs are used by the file server 9002 is referred to herein as "licensing." Thus, in practice, the file server 9002 will typically be licensed for some SDs and unlicensed for others.

Internally, the file server 9002 is capable of combining several SDs into a larger storage pool referred to herein as a "span." A span is essentially a RAID 0 array of several SDs. Combining several SDs into a span can provide a number of benefits similar to those obtained by combining multiple physical disks into an SD, including increased speed (spreading I/O between multiple SDs on multiple RAID systems can widen the storage bottleneck further), increased storage capacity (the span can be larger than a single SD, which may be limited to two terabytes), and additional abstraction, which allows for more flexible storage space allocation.

The file server 9002 stores various types of objects in the filesystem. The objects may be classified generally as system objects and file objects. File objects are created for storage of user data and associated attributes, such as a word processor or spreadsheet files. System objects are created by the file storage system for managing information.

An instantiation of the filesystem is managed using a tree structure having root node (termed a dynamic superblock or DSB) that is stored at a fixed location within the storage system. Among other things, storing the DSB at a fixed location makes it easy for the file server 9002 to locate the DSB. The file server 9002 may maintain multiple DSBs to store different versions of the filesystem representing different checkpoints (e.g., a current "working" version and one or more "checkpoint" versions). In an exemplary embodiment, the DSB includes a pointer to an indirection object (described in detail below), which in turn includes pointers to other objects.

Figure 2:
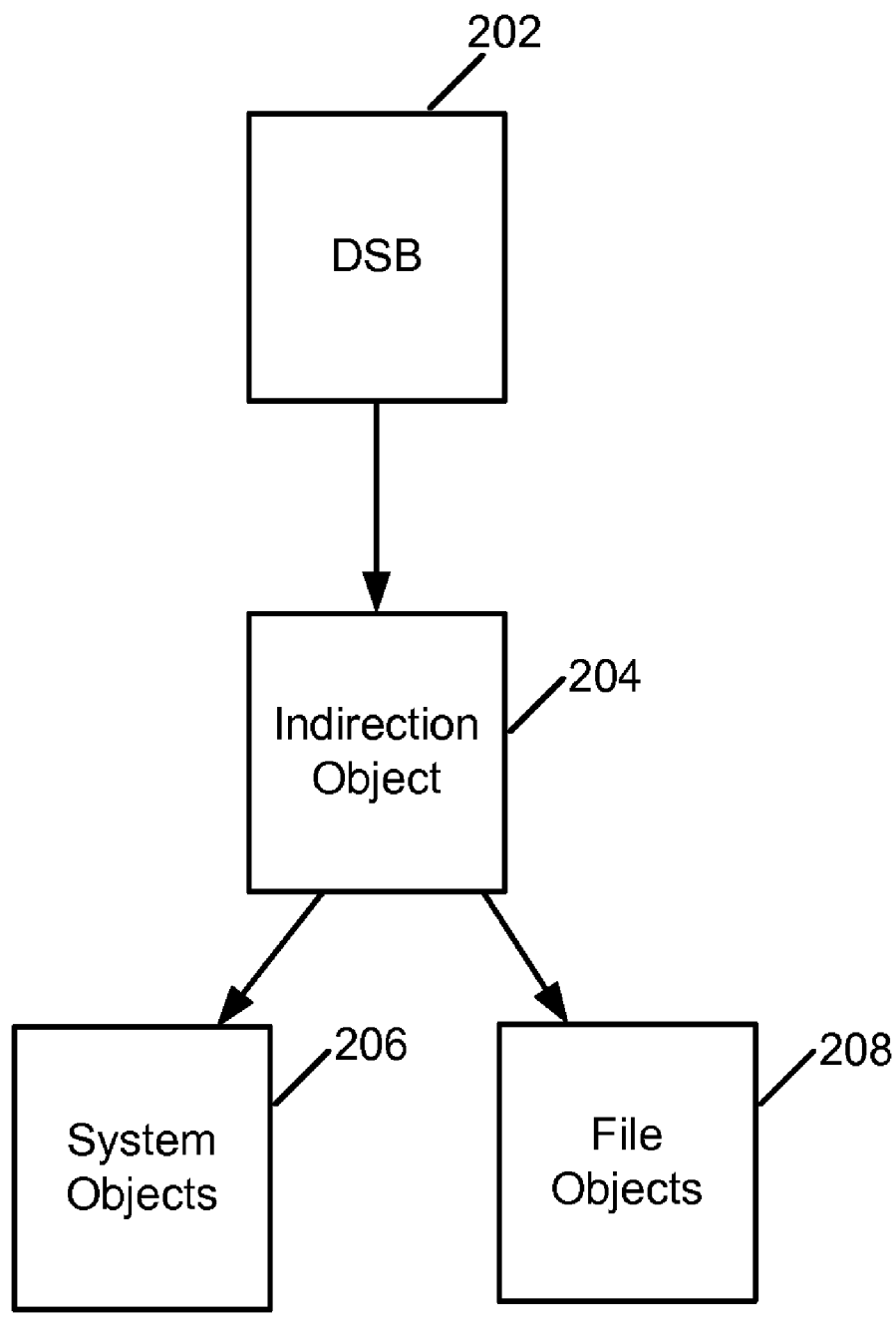
FIG. 2 is a schematic block diagram showing the general format of a filesystem in accordance with an exemplary embodiment of the present invention.

FIG. 2 is a schematic block diagram showing the general format of a filesystem instantiation in accordance with an exemplary embodiment of the present invention. The DSB 202 is a special structure that represents the root of the filesystem tree structure. Among other things, the DSB 202 includes a pointer to an indirection object 204, which in turn includes pointers to other objects in the filesystem including system objects 206 and file objects 208.

Generally speaking, each object in the filesystem, including the indirection object 204, the system objects 206, and the file objects 208, is implemented using a separate tree structure that includes a separate object root node and optionally includes a number of indirect nodes, direct nodes, and storage blocks. The DSB 202 includes a pointer to the root node of the indirection object 204. The indirection object 204 includes pointers to the root nodes of the other objects.

Figure 3:
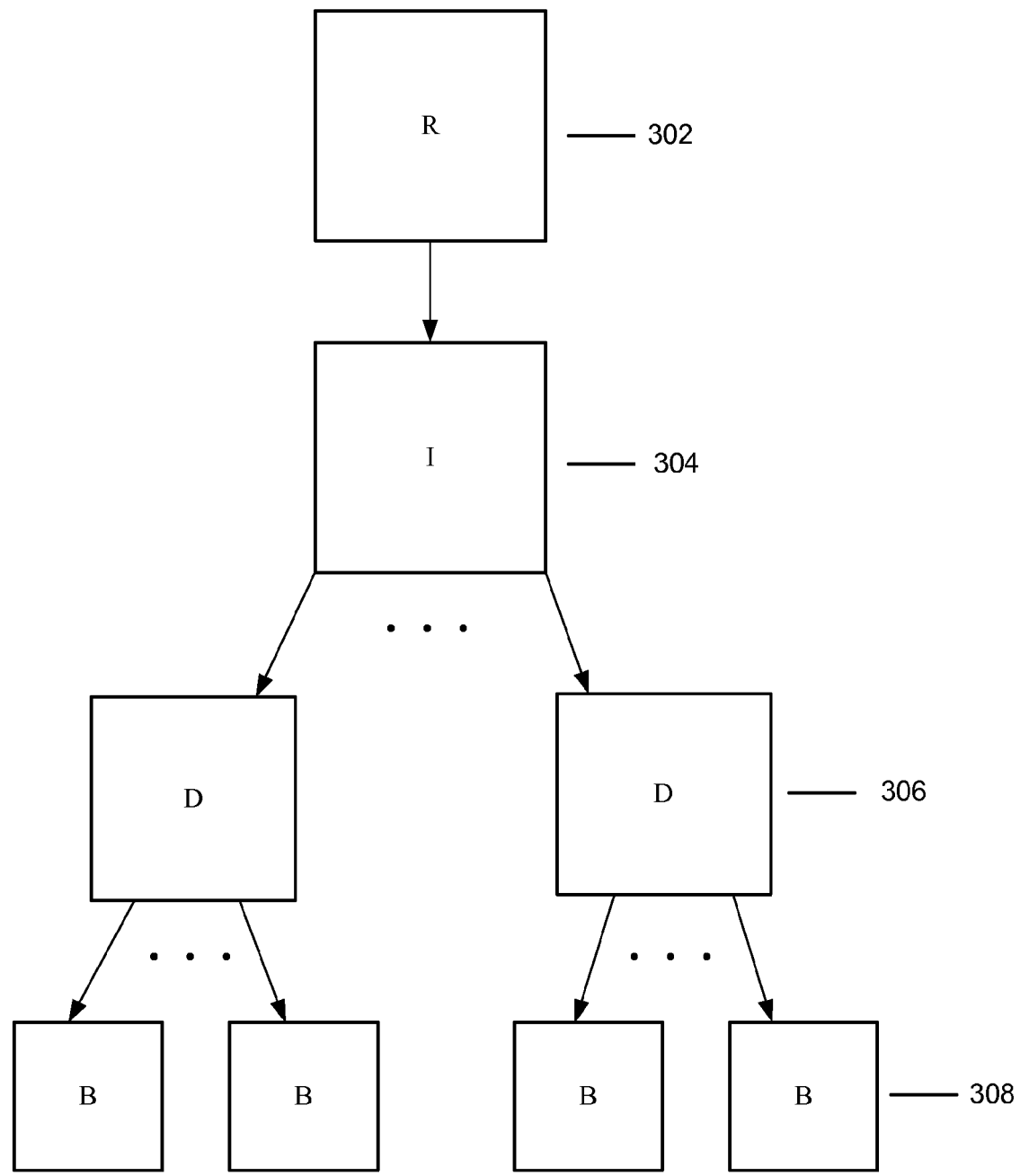
FIG. 3 is a schematic block diagram showing the general format of an object tree structure in accordance with an exemplary embodiment of the present invention.

FIG. 3 is a schematic block diagram showing the general format of an object tree structure in accordance with an exemplary embodiment of the present invention. A root ("R") node 302 may point to various indirect ("I") nodes 304, each of which may point to a number of direct ("D") nodes 306, each of which may point to a number of storage blocks ("B") 308. In practice, object tree structures can vary widely, for example, depending on the size of the object. Also, the tree structure of a particular object can vary over time as information is added to and deleted from the object. For example, nodes may be dynamically added to the tree structure as more storage space is used for the object, and different levels of indirection may be used as needed (e.g., an indirect node can point to direct nodes or to other indirect nodes). It should be noted that the indirection object 204 includes pointers to the root nodes of the other objects.

Within the file storage system, each object is associated with an object number that is used to reference the object. System objects typically have fixed, predefined object numbers, since they generally always exist in the system. File objects are typically assigned object numbers dynamically from a pool of available object numbers. These file object numbers may be reused in some circumstances (e.g., when a file is deleted, its object number may be freed for reuse by a subsequent file object).

FIG. 4 shows a representation of object number assignments for an exemplary embodiment of the present invention. Specifically, the filesystem may include Z object numbers (where Z is variable and may grow over time as the number of objects increases). A certain range of object numbers is reserved for system objects 206 (in this example, object numbers 1-J), and the remaining object numbers (in this example, object numbers K-Z) are assigned to file objects 208. Typically, the number of system objects 206 is fixed, while the number of file objects 208 may vary.

Figure 5:
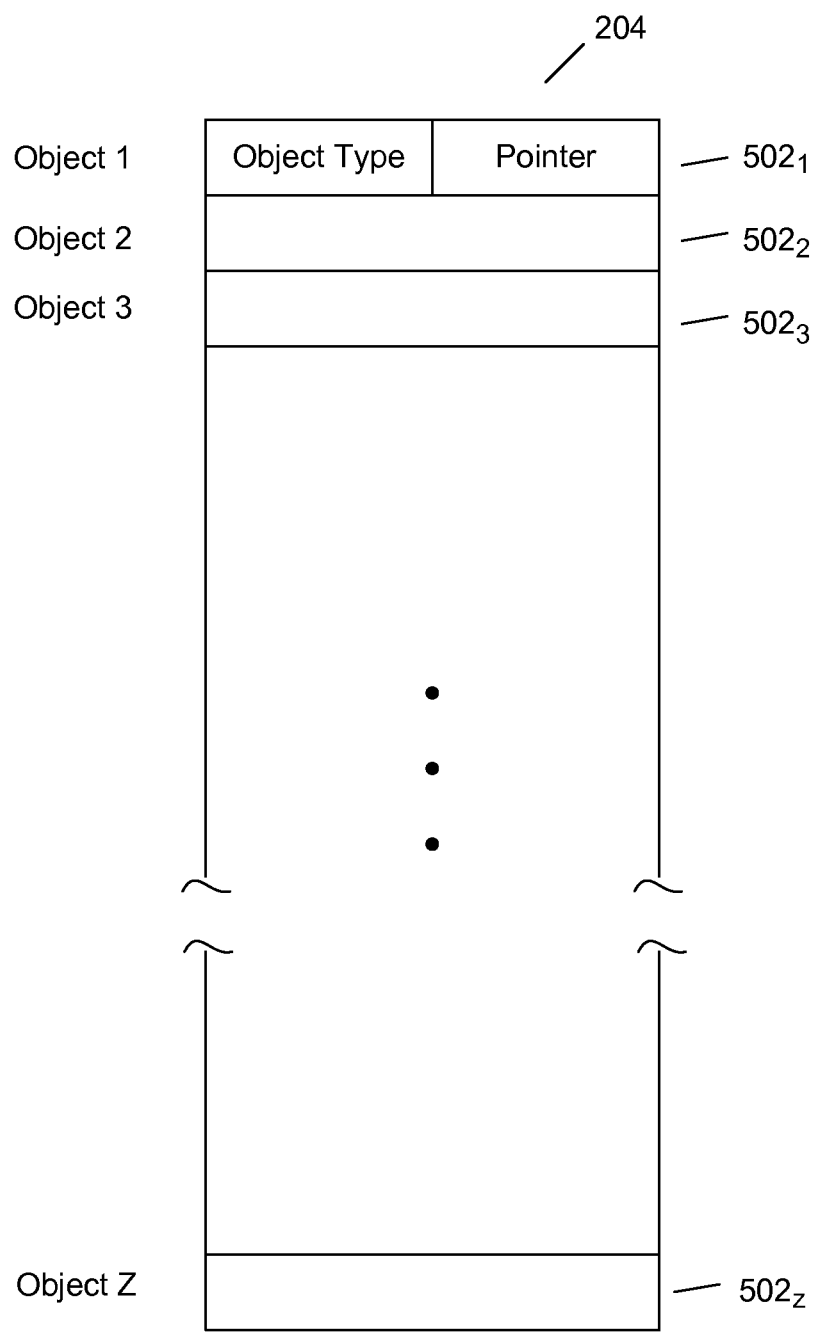
FIG. 5 is a schematic block diagram showing the general format of the indirection object in accordance with an exemplary embodiment of the present invention.

In an exemplary embodiment, the indirection object 204 is logically organized as a table, with one table entry per object indexed by object number. As shown in FIG. 5, each entry 502 in the table includes an object type field and a pointer field. A number of different values are defined for the object type field, but for the sake of discussion, one set of values is defined for "used" objects and another set of values is defined for "free" objects. Thus, the value in the object type field of a particular table entry will indicate whether the corresponding object number is used or free. The pointer field of each used table entry includes a pointer to the root node of the object. As discussed in greater detail below, the pointer fields of free table entries are used to form one or more singly-linked non-circular lists of free object numbers.

Thus, when an object is created, an object root node is created, and an object number is assigned to the object. A pointer to the object root node is stored in the indirection object 204, specifically in the table entry associated with the assigned object number. Therefore, the file server 9002 can easily locate the object root node of any object based on its object number, specifically by indexing into the indirection object table structure and accessing the pointer field.

In an exemplary embodiment, the indirection object may be implemented as a "pseudo-file" having no storage blocks. The logical table structure of the indirection object may be represented using the pointer fields and other information fields in the object root node and any direct and indirect nodes without storing data in storage blocks.

In embodiments of the present invention, at least one free object number list is maintained within the indirection object itself, e.g., in the form of singly-linked, non-circular list(s). The table entry associated with each free object number includes a reference to a next free object number in its free object number list rather than a pointer to the root node of an object. Because a free object number list is a singly-linked, non-circular list in an exemplary embodiment, the table entry associated with the last free object number in a free object number list includes a "null" reference (e.g., the value zero).

Theoretically, it would be possible to maintain a single free object number list in the indirection object. Free object numbers in the list could be recycled and removed from the list as new objects are created, and free object numbers could be added to the list as objects are deleted from the system.

In an exemplary embodiment of the invention, however, two separate free object number lists are maintained in the indirection object, one listing free object numbers that are immediately available for recycling and the other listing newly freed object numbers that are not immediately available for recycling. In this exemplary embodiment, the file server takes a "checkpoint" or "snapshot" of the filesystem from time to time (e.g., as discussed in U.S. patent application Ser. No. 10/286,015 entitled Apparatus and Method for Hardware-Based File System filed on Nov. 1, 2002 in the name of Geoffrey S. Barrall et al. and U.S. patent application Ser. No. 11/841,353 entitled Apparatus and Method for Hardware-Based File System filed on Aug. 20, 2007 in the name of Geoffrey S. Barrall et al., both of which are hereby incorporated herein by reference in their entireties), such that, at any give time, the file server has a "working copy" of the filesystem that may change, for example, as objects are created, deleted, and modified. For various reasons, it is important for this exemplary embodiment to ensure that, over time, different objects that are assigned a particular recycled object number are given different object handles. Therefore, in this exemplary embodiment, two free object number lists are used to ensure that a particular object number cannot be freed and reused within the same working copy of the filesystem (i.e., by adding freed object numbers to one list but allocating object numbers from the other list), and the bottom 32 bits of the current checkpoint number are included in the object handle when the object is created so that objects created in different checkpoints will have different handles. Thus, during any particular working copy of the filesystem, the file server recycles free object numbers from one list while adding newly freed object numbers to the other list. At each "checkpoint," the roles of the two lists are "swapped" so that object numbers freed during the previous checkpoint are available to be recycled while new object numbers that are freed during the current checkpoint are not available to be recycled during that checkpoint. If the list from which free object numbers are being recycled is empty when a new object is being created, then the indirection object is expanded in order to provide additional free object numbers (even though there may actually be some free object numbers in the other list). In practice, however, both lists will generally accumulate a number of free object numbers over time due to the role swapping at each checkpoint, so, in the steady state, the indirection object should not need to expand often.

Figure 6:
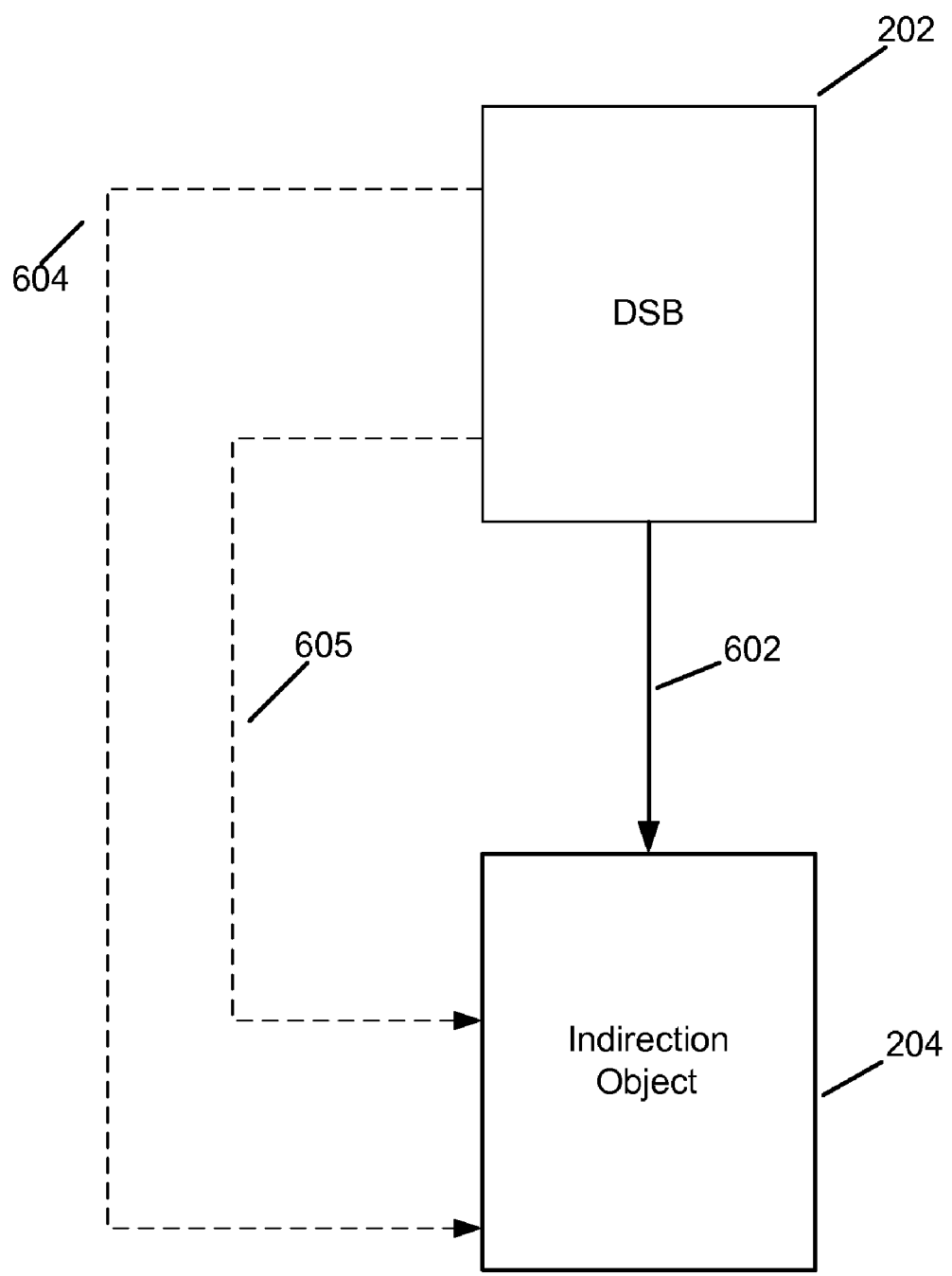
FIG. 6 is a schematic block diagram showing the relationship between the DSB and the indirection object in accordance with an exemplary embodiment of the present invention.

FIG. 6 is a schematic block diagram showing the relationship between the DSB 202 and the indirection object 204 in accordance with an exemplary embodiment of the present invention. As shown, the DSB 202 includes a pointer 602 to the indirection object 204 (and, more specifically, to the root node of the indirection object 204), and also includes two pointers 604 and 605, one for each of the free object number lists in the indirection object 204. For convenience, the two pointers may be referred to hereinafter as "DSB.listA" and "DSB.listB." Each pointer 604, 605 points to the table entry at the start of its respective free object number list. Because the DSB 202 is stored at a fixed location within the storage system and includes pointers to the indirection object 204 and the free object number lists within the indirection object 204, the file server 9002 can easily locate the indirection object 204 (and hence the root node of any other object) as well as free object number lists using the DSB 202.

Thus, with reference again to the table structure of the indirection object 204 shown in FIG. 5, the value in the object type field of a particular table entry will indicate whether the corresponding object number is used or free. If that object number is used, then the pointer field of that table entry will include a pointer to the root node of the corresponding object. If, however, that object number is free, then the pointer field of that table entry will include a reference to a next free object number in its free object number list.

Generally speaking, freed object numbers are added to the head of a free object number list, and recycled object numbers are also taken from the head of a free object number list. The following is exemplary pseudo-code for adding a freed object number "i" to free object number list A:

table[i].type=free
table[i].pointer=DSB.listA
DSB.listA=i

The following is exemplary pseudo-code for recycling a free object number from free object number list A:

i=DSB.listA
DSB.listA=table[i].pointer
table[i].type=used
table[i].pointer=pointer to object root node As discussed above, it may be necessary or desirable to verify the indirection object 204, including the free object number list(s), from time to time in order to ensure that all free object numbers are included in the free object number list(s) and that no "used" object numbers are included in the free object number list(s). One way to verify the indirection object 204, including the free object number list(s), is to traverse each free object number list from the start to end to ensure that there are no loops and to ensure that the list ends with a null reference. However, in a working data storage system, it is not unusual for large numbers of objects to be created and deleted over time, such that the free object number list(s) can become quite long. Furthermore, the free object number lists are not ordered but instead are updated as object numbers happen to be used and freed, so traversing a free object number list would generally entail jumping around the indirection object

204 according to the references of the singly-linked list. Such traversal of a free object number list would generally be slow and inefficient.

Therefore, in an exemplary embodiment of the present invention, the indirection object table structure is traversed sequentially from top to bottom, and the "used" and "free" object numbers are tracked using a bitmap or other appropriate data structure. Specifically, if a particular object number is used, then the corresponding bit in the bitmap is marked; if that bit was already marked, then the indirection object is corrupted (e.g., because that "used" object number is erroneously referenced by an earlier "free" entry). If a particular object number is free, then the corresponding entry in the indirection object table structure includes a reference to the next free object number in the free object number list, so the bit corresponding to such next free object number is marked in the bitmap; if that bit was already marked, then the indirection object is corrupted (e.g., because the free object number list includes a "used" object number or because the free object number list includes a circular reference). After the entire indirection object table structure has been traversed, the two starting table entries, which are pointed to by the pointers 604, 605 in the DSB 202, are checked, and if either table entry is "used," then the indirection object is corrupted. Furthermore, after the entire indirection object table structure has been traversed, the only bits that should be left unmarked are the bits associated with the two starting table entries for the two free object number lists, which are pointed to by the pointers 604, 605 in the DSB 202. If either of those bits is marked, then the indirection object is corrupted. If any other bits in the bitmap are unmarked, then the corresponding object numbers are neither used nor included in the free object number lists, in which case the indirection object is usable (because such "unlinked" free entries will not be recycled in the normal course). Additional processing may be performed to ensure that each free object number list terminates with a null reference.

In various alternative embodiments, the bitmap could be initialized to all zeros, and a bit in the bitmap could be "marked" by setting the bit (i.e., to one); in this regard, a so-called "test-and-set" operation may be used to both test the value of the bit and set the bit in a single operation. Alternatively, the bitmap could be initialized to all ones and a bit in the bitmap could be "marked" by clearing the bit (i.e., to zero). Of course, other types of data structures and other types of marking schemes may be used in other embodiments. The present invention is not limited to the use of a bitmap or to any particular type of data structure or marking scheme.

FIG. 7 is a logic flow diagram showing exemplary high-level pseudo-code for validating the indirection object 204 in accordance with an exemplary embodiment of the present invention. The logic first initializes the bitmap. The logic then sequentially processes each table entry in the indirection object. Specifically, the logic inspects the object type field of the table entry to determine whether the corresponding object number is used or free. If the object number is used, then the logic checks the corresponding bit in the bitmap to see if it is already marked; if so, then processing terminates because the indirection object is corrupted; if not, then the logic marks the bit. If, on the other hand, the object number is free, then unless the next free object number referenced in the table entry is zero, the logic checks the bit in the bitmap corresponding to the next free object number referenced in the table entry to see if it is already marked; if so, then processing terminates because the indirection object is corrupted; if not, then the logic marks the bit. Assuming no errors were found during processing of the table entries, the logic performs additional processing to check that the two starting table entries for the two free object number lists are "free" and that the only bits left unmarked in the bitmap are the bits associated with the two starting table entries for the two free object number lists (e.g., by testing those bits and setting them if unmarked, and then checking to see if any other bits remain unmarked); if so, then the indirection object is valid; if not, then the indirection object is corrupted. If the only problem is that there is one or more "unlinked" free object numbers, then the indirection object is considered to be usable.

The following examples are included to demonstrate a number of scenarios in which valid and error conditions are detected in accordance with the processing described above. For the sake of simplicity, these examples are based on sample indirection object structures and corresponding bitmaps that include eight entries each, although, in practice, these data structures would typically be significantly larger. Each table entry is designated by an entry number and includes a type field indicating the entry type (i.e., used or free) and a pointer field indicating, for free entries, the next entry number in the list. For convenience and clarity, pointers for "used" entries are omitted. The starting table entries for the two free object number lists are indicated by "ListA" and "ListB" pointers.

Example 1

Valid Indirection Object

The following is a representation of a validly formatted indirection object in accordance with an exemplary embodiment of the present invention:

|  | Entry | Type | Pointer |
|---|---|---|---|
|  | 1 | used |  |
|  | 2 | free | next = 8 |
|  | 3 | used |  |
| List A -----> | 4 | free | next = 2 |
|  | 5 | used |  |
| List B -----> | 6 | free | next = 0 |
|  | 7 | used |  |
|  | 8 | free | next = 0 |

The following is a representation of the processing sequence for the sample indirection object above:

| Entry | Action |
|---|---|
| 1 | mark bit 1 |
| 2 | mark bit 8 |
| 3 | mark bit 3 |
| 4 | mark bit 2 |
| 5 | mark bit 5 |
| 6 |  |
| 7 | mark bit 7 |
| 8 |  |

After processing the table entries sequentially without error, the bits indicated by the ListA and ListB pointers (i.e., bits 4 and 6) are checked. Since bits 4 and 6 are the only unmarked bits in the bitmap, the indirection object is deemed to be valid. It should be noted that, in this example, free object number list A includes entries 4, 2, and 8 (in that order), while free object number list B includes only entry 6.

Example 2

Free List Includes a Later Used Entry

The following is a representation of an invalidly formatted indirection object in which a free list includes a later used entry, in accordance with an exemplary embodiment of the present invention:

|  | Entry | Type | Pointer |
|---|---|---|---|
|  | 1 | used |  |
|  | 2 | free | next = 8 |
|  | 3 | used |  |
| List A -----> | 4 | free | next = 2 |
|  | 5 | used |  |
| List B -----> | 6 | free | next = 7 |
|  | 7 | used |  |
|  | 8 | free | next = 0 |

The following is a representation of the processing sequence for the sample indirection object above:

| Entry | Action |
|---|---|
| 1 | mark bit 1 |
| 2 | mark bit 8 |
| 3 | mark bit 3 |
| 4 | mark bit 2 |
| 5 | mark bit 5 |
| 6 | mark bit 7 |
| 7 | ERROR - BIT 7 ALREADY MARKED |
| 8 |  |

In this example, when processing table entry 7, since table entry 7 is used, bit 7 is checked in the bitmap. Since bit 7 was already marked during the processing of table entry 6, the indirection object is deemed to be invalid because a used table entry is included in a free object number list.

Example 3

Free List Includes an Earlier Used Entry

The following is a representation of an invalidly formatted indirection object in which a free list includes an earlier used entry, in accordance with an exemplary embodiment of the present invention:

|  | Entry | Type | Pointer |
|---|---|---|---|
|  | 1 | used |  |
|  | 2 | free | next = 8 |
|  | 3 | used |  |
| List A -----> | 4 | free | next = 2 |
|  | 5 | used |  |
| List B -----> | 6 | free | next = 5 |
|  | 7 | used |  |
|  | 8 | free | next = 0 |

The following is a representation of the processing sequence for the sample indirection object above:

| Entry | Action |
|---|---|
| 1 | mark bit 1 |
| 2 | mark bit 8 |
| 3 | mark bit 3 |
| 4 | mark bit 2 |
| 5 | mark bit 5 |
| 6 | ERROR - BIT 5 ALREADY MARKED |
| 7 |  |
| 8 |  |

In this example, when processing table entry 6, since table entry 6 is free, bit 5 (which is referenced in table entry 6) is checked in the bitmap. Since bit 5 was already marked during the processing of table entry 5, the indirection object is deemed to be invalid because a used table entry is included in a free object number list.

Example 4

Unlinked Free Entry

The following is a representation of an invalidly formatted indirection object including an unlinked free entry, in accordance with an exemplary embodiment of the present invention:

|  | Entry | Type | Pointer |
|---|---|---|---|
|  | 1 | used |  |
|  | 2 | free | next = 0 |
|  | 3 | used |  |
| List A -----> | 4 | free | next = 2 |
|  | 5 | used |  |
| List B -----> | 6 | free | next = 0 |
|  | 7 | used |  |
|  | 8 | free | next = 0 |

The following is a representation of the processing sequence for the sample indirection object above:

| Entry | Action |
|---|---|
| 1 | mark bit 1 |
| 2 |  |
| 3 | mark bit 3 |
| 4 | mark bit 2 |
| 5 | mark bit 5 |
| 6 |  |
| 7 | mark bit 7 |
| 8 |  |

After processing the table entries sequentially, the bits indicated by the ListA and ListB pointers (i.e., bits 4 and 6) are checked. Even though bits 4 and 6 are unmarked, a problem exists because bit 8 is also unmarked, but the indirection object is considered to be usable because object number 8 effectively cannot be recycled.

Example 5

Free Entry in Both Free Lists

The following is a representation of an invalidly formatted indirection object in which a free entry is included in both free object number lists, in accordance with an exemplary embodiment of the present invention:

|  | Entry | Type | Pointer |
|---|---|---|---|
|  | 1 | used |  |
|  | 2 | free | next = 8 |
|  | 3 | used |  |
| List A -----> | 4 | free | next = 2 |
|  | 5 | used |  |
| List B -----> | 6 | free | next = 8 |
|  | 7 | used |  |
|  | 8 | free | next = 0 |

The following is a representation of the processing sequence for the sample indirection object above:

| Entry | Action |
|---|---|
| 1 | mark bit 1 |
| 2 | mark bit 8 |
| 3 | mark bit 3 |
| 4 | mark bit 2 |
| 5 | mark bit 5 |
| 6 | ERROR - BIT 8 ALREADY MARKED |
| 7 |  |
| 8 |  |

In this example, object number 8 is included in both free object number lists. When processing table entry 6, since table entry 6 is free, bit 8 (which is referenced in table entry 6) is checked in the bitmap. Since bit 8 was already marked during the processing of table entry 2, the indirection object is deemed to be invalid.

Example 6

Circular Free List

The following is a representation of an invalidly formatted indirection object having a circular free list, in accordance with an exemplary embodiment of the present invention:

|  | Entry | Type | Pointer |
|---|---|---|---|
|  | 1 | used |  |
|  | 2 | free | next = 8 |
|  | 3 | used |  |
| List A -----> | 4 | free | next = 2 |
|  | 5 | used |  |
| List B -----> | 6 | free | next = 0 |
|  | 7 | used |  |
|  | 8 | free | next = 4 |

The following is a representation of the processing sequence for the sample indirection object above:

| Entry | Action |
|---|---|
| 1 | mark bit 1 |
| 2 | mark bit 8 |
| 3 | mark bit 3 |
| 4 | mark bit 2 |
| 5 | mark bit 5 |
| 6 |  |
| 7 | mark bit 7 |
| 8 | mark bit 4 |

After processing the table entries sequentially without error, the bits indicated by the ListA and ListB pointers (i.e., bits 4 and 6) are checked. Since bit 4 was already marked during the processing of table entry 8, the indirection object is deemed to be invalid.

Example 7

Loop in Free List

The following is a representation of an invalidly formatted indirection object having a loop in a free list, in accordance with an exemplary embodiment of the present invention:

|  | Entry | Type | Pointer |
|---|---|---|---|
|  | 1 | used |  |
|  | 2 | free | next = 8 |
|  | 3 | used |  |
| List A -----> | 4 | free | next = 2 |
|  | 5 | used |  |
| List B -----> | 6 | free | next = 0 |
|  | 7 | used |  |
|  | 8 | free | next = 2 |

The following is a representation of the processing sequence for the sample indirection object above:

| Entry | Action |
|---|---|
| 1 | mark bit 1 |
| 2 | mark bit 8 |
| 3 | mark bit 3 |
| 4 | mark bit 2 |
| 5 | mark bit 5 |
| 6 |  |
| 7 | mark bit 7 |
| 8 | ERROR - BIT 2 ALREADY MARKED |

In this example, the loop from table entry 8 back to table entry 2 is detected during processing of table entry 8, specifically when bit 2 (which is referenced in table entry 8) is checked and found to be already marked. Thus, the indirection object is deemed to be invalid.

Example 8

Invalid Start Pointer in DSB

The following is a representation of an invalidly formatted indirection object in which the DSB includes a pointer that does not point to the start of a free object number list, in accordance with an exemplary embodiment of the present invention:

|  | Entry | Type | Pointer |
|---|---|---|---|
|  | 1 | used |  |
|  | 2 | free | next = 8 |
|  | 3 | used |  |
| List A -----> | 4 | free | next = 2 |
|  | 5 | used |  |
|  | 6 | free | next = 0 |
| List B -----> | 7 | used |  |
|  | 8 | free | next = 0 |

The following is a representation of the processing sequence for the sample indirection object above:

| Entry | Action |
|---|---|
| 1 | mark bit 1 |
| 2 | mark bit 8 |
| 3 | mark bit 3 |
| 4 | mark bit 2 |
| 5 | mark bit 5 |
| 6 | |
| 7 | mark bit 7 |
| 8 | |

After processing the table entries sequentially without error, the bits indicated by the ListA and ListB pointers (i.e., bits 4 and 7) are checked. Since bit 7 was already marked during the processing of table entry 7, the indirection object is deemed to be invalid.

Various embodiments may perform additional error checking. For example, before marking a bit in the bitmap (particularly based on a reference to a free object number, i.e., the variable "j" in pseudo-code shown in FIG. 7), a check may be performed to make sure that the reference is within the range of valid object numbers (i.e., if there are Z object numbers, a value greater than Z would be erroneous, indicating that the indirection object is corrupted). Similar error checking could be performed for the two start pointers (i.e., DSB.listA and DSB.listB). Also, before attempting to recycle a table entry from a free object number list, a check may be performed to ensure that the free object number list is not empty (i.e., that the start pointer DSB.listA or DSB.listB is not null).

Furthermore, if the indirection object is determined to be corrupted, then various embodiments may perform additional error processing to determine the type of error that exists. For example, if a particular object number is used but the corresponding bit in the bitmap is already marked, then that object number may be erroneously included in the free object number list. Similarly, if the bit associated with an object number referenced in a "free" table entry is already marked and that referenced object number is used, then that referenced object number may be erroneously included in the free object list. If the bit associated with an object number referenced in a "free" table entry is already marked and that referenced object number is free, then the free object number list may include a circular reference. Other error scenarios may exist.

While the free object number list is a non-circular list in the exemplary embodiment described above, it should be noted that, with appropriate changes to the described validation logic, the free object number list could be implemented using a circular list such that the table entry associated with the last free object number in the free object number list includes a reference back to the table entry associated with the first free object number in the free object number list. Thus, for example, if the free object number list were to include only one free object number, then the table entry associated with that free object number would include a reference to itself instead of a "null" pointer. In such an embodiment, if the indirection object is valid, then the bit associated with the first free object number in the free object number list would be marked during the sequential processing of the table entries (i.e., when the table entry associated with the last free object number in the free object number list is processed), so the logic would not need to specifically check that bit after completing the sequential processing of the table entries. Thus, the following portion of the pseudo-code shown in FIG. 7 would not need to be performed:

```
if (bitmap[DSB.listA] or bitmap[DSB.listB] is already marked)
    return - indirection object is corrupted
else
    mark bitmap[DSB.listA] and bitmap[DSB.listB]
endif
```

Figure 8:
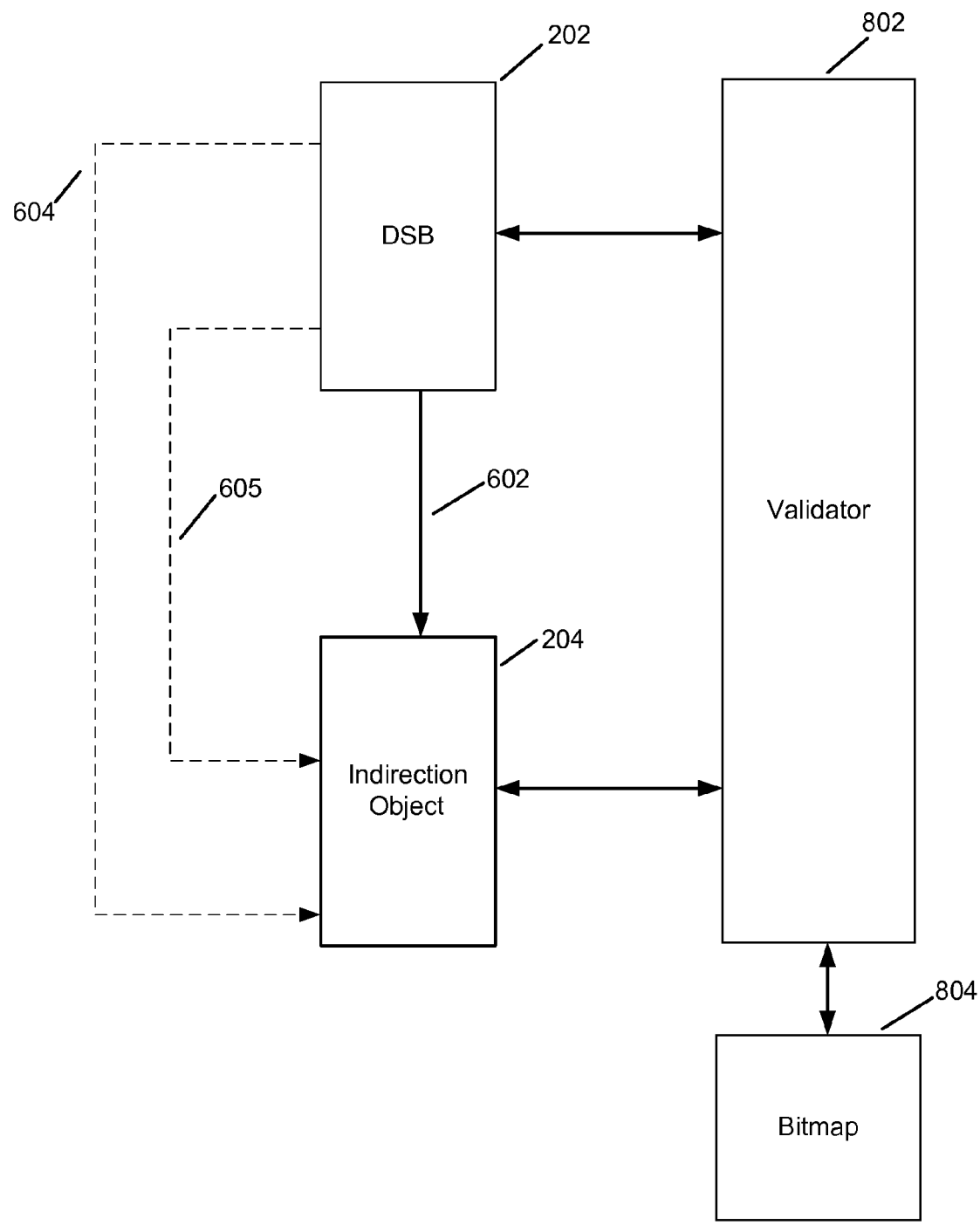
FIG. 8 is a schematic block diagram for a data structure validation system in accordance with an exemplary embodiment of the present invention.

FIG. 8 is a schematic block diagram for a data structure validation system in accordance with an exemplary embodiment of the present invention. Among other things, the validation system includes a validator 802 and a bitmap 804. The validator 802 may access the DSB 202 to locate the indirection object 204 via pointer 602 and/or the start of each free object number list within the indirection object 204 via pointers 604, 605. The validator 802 steps sequentially through the table entries of the indirection object 204, marking used and free object numbers in the bitmap 804 substantially as described above. Assuming no error is encountered during the sequential processing of the table entries, the validator 802 every object number is accounted for in the bitmap 804.

It should be noted that, by traversing the indirection object table structure sequentially and using a bitmap (or other appropriate data structure) to track used and unused object numbers, the indirection object can be validated using a single pass through the indirection object. In an exemplary embodiment of the present invention, such sequential processing enables multiple pointers to be read during a single read operation and also enables the file server to leverage read-ahead functionality that is available in an exemplary embodiment. Thus, an exemplary embodiment provides an efficient way to validate the indirection object.

It should also be noted that, although a bitmap is used to track used and free object numbers in an exemplary embodiment, other types of data structures may alternatively be used to track used and free object numbers. For example, an array or table may be used to track used and free object numbers, with a separate array/table entry associate with each object number.

It should also be noted that, although pointers to the starts of the free object number lists are maintained in the DSB 202 in an exemplary embodiment, the pointers to the starts of the free object number lists may be maintained elsewhere, and the present invention is not limited to any particular manner of maintaining the start pointers.

It should also be noted that, although the roles of the two free object numbers lists are "swapped" at each checkpoint in an exemplary embodiment described above, the free object number lists could be managed in other ways. For example, at each checkpoint, the two lists could be could be combined so that all free object numbers are available for recycling, and one of the lists could be used to track object numbers that are freed during the new checkpoint.

It should also be noted that, because each table entry in the indirection object is processed discretely in an exemplary embodiment, it may be possible to divide up the processing of the indirection object, for example, using multiple computer tasks, multiple computer processors, or multiple instances of hardware logic. Each task, processor, or hardware logic instance could operate on a different, non-overlapping portion of the indirection object table, with the bitmap stored, for example, in a common or shared memory.

It should also be noted that, while an exemplary embodiment described above includes two free object number lists within the indirection object, the present invention is not limited to two free object number lists. Rather, a single free object number list, or, for that matter, more than two free object number lists, may be included within the indirection object, and the logic described with reference to FIG. 7 could be modified appropriately for validating such alternative indirection objects.

It should also be noted that, while exemplary embodiments described above includes one or more free object number lists within an indirection object table structure specifically for tracking free object numbers, the present invention is not limited to any particular use for the table structure or the link list(s) within the table structure. Thus, similar data structures may be used in various alternative embodiments unrelated to object numbers.

The present invention may be embodied in many different forms, including, but in no way limited to, computer program logic for use with a processor (e.g., a microprocessor, microcontroller, digital signal processor, or general purpose computer), programmable logic for use with a programmable logic device (e.g., a Field Programmable Gate Array (FPGA) or other PLD), discrete components, integrated circuitry (e.g., an Application Specific Integrated Circuit (ASIC)), or any other means including any combination thereof.

Computer program logic implementing all or part of the functionality previously described herein may be embodied in various forms, including, but in no way limited to, a source code form, a computer executable form, and various intermediate forms (e.g., forms generated by an assembler, compiler, linker, or locator). Source code may include a series of computer program instructions implemented in any of various programming languages (e.g., an object code, an assembly language, or a high-level language such as Fortran, C, C++, JAVA, or HTML) for use with various operating systems or operating environments. The source code may define and use various data structures and communication messages. The source code may be in a computer executable form (e.g., via an interpreter), or the source code may be converted (e.g., via a translator, assembler, or compiler) into a computer executable form.

The computer program may be fixed in any form (e.g., source code form, computer executable form, or an intermediate form) either permanently or transitorily in a tangible storage medium, such as a semiconductor memory device (e.g., a RAM, ROM, PROM, EEPROM, or Flash-Programmable RAM), a magnetic memory device (e.g., a diskette or fixed disk), an optical memory device (e.g., a CD-ROM), a PC card (e.g., PCMCIA card), or other memory device. The computer program may be fixed in any form in a signal that is transmittable to a computer using any of various communication technologies, including, but in no way limited to, analog technologies, digital technologies, optical technologies, wireless technologies (e.g., Bluetooth), networking technologies, and internetworking technologies. The computer program may be distributed in any form as a removable storage medium with accompanying printed or electronic documentation (e.g., shrink wrapped software), preloaded with a computer system (e.g., on system ROM or fixed disk), or distributed from a server or electronic bulletin board over the communication system (e.g., the Internet or World Wide Web).

Hardware logic (including programmable logic for use with a programmable logic device) implementing all or part of the functionality previously described herein may be designed using traditional manual methods, or may be designed, captured, simulated, or documented electronically using various tools, such as Computer Aided Design (CAD), a hardware description language (e.g., VHDL or AHDL), or a PLD programming language (e.g., PALASM, ABEL, or CUPL).

Programmable logic may be fixed either permanently or transitorily in a tangible storage medium, such as a semiconductor memory device (e.g., a RAM, ROM, PROM, EEPROM, or Flash-Programmable RAM), a magnetic memory device (e.g., a diskette or fixed disk), an optical memory device (e.g., a CD-ROM), or other memory device. The programmable logic may be fixed in a signal that is transmittable to a computer using any of various communication technologies, including, but in no way limited to, analog technologies, digital technologies, optical technologies, wireless technologies (e.g., Bluetooth), networking technologies, and internetworking technologies. The programmable logic may be distributed as a removable storage medium with accompanying printed or electronic documentation (e.g., shrink wrapped software), preloaded with a computer system (e.g., on system ROM or fixed disk), or distributed from a server or electronic bulletin board over the communication system (e.g., the Internet or World Wide Web).

The present invention may be embodied in other specific forms without departing from the true scope of the invention. The described embodiments are to be considered in all respects only as illustrative and not restrictive.

What is claimed is:

1. A method of validating a data structure in a storage system, the data structure comprising a table having a sequence of table entries, each table entry including a type field and a pointer field, the type field indicating whether the table entry is used or free, the pointer field including a reference to a next free table entry if the table entry is free such that the data structure includes at least one list of free table entries linked using pointer fields, the method comprising:
   (a) maintaining a tracking structure in a memory, the tracking structure including a corresponding status field for each table entry, the status fields having an unmarked state and a marked state;
   (b) processing the table entries sequentially and tracking the used and free table entries using the tracking structure, such tracking including marking the status fields corresponding to used table entries and marking the status fields corresponding to the next free table entries referenced in the pointer fields of free table entries; and
   (c) determining validity of the data structure based on the tracking structure.

2. A method according to claim 1, wherein the tracking structure includes one of:
   a bitmap;
   an array; and
   a table.

3. A method according to claim 1, wherein processing the table entries sequentially and tracking the used and free table entries using the tracking structure comprises, for each table entry:
   (b1) determining whether the table entry is used or free based on the type field;
   (b2) if the table entry is used and the corresponding status field in the tracking structure is marked, outputting an error indication indicating that the data structure is corrupted;
   (b3) if the table entry is used and the corresponding status field in the tracking structure is unmarked, marking such status field in the tracking structure;
   (b4) if the table entry is free and the status field corresponding to the next free table entry referenced in the pointer field of the table entry is marked, outputting an error indication indicating that the data structure is corrupted; and (b5) if the table entry is free and the status field corresponding to the next free table entry referenced in the pointer field of the table entry is unmarked, marking such status field in the tracking structure.

4. A method according to claim 3, further comprising:
outputting an error indication if the tracking structure includes any erroneous unmarked status entries after the sequential processing of the table entries.

5. A method according to claim 1, wherein the list of free table entries is non-circular.

6. A method according to claim 1, wherein the list of free table entries is circular such that a last free table entry includes a reference to a first free table entry.

7. A method according to claim 1, wherein the data structure includes a plurality of free table entries lists.

8. A method according to claim 1, wherein the data structure is a filesystem indirection object.

9. Apparatus providing for validation of a data structure in a storage system, the data structure comprising a table having a sequence of table entries, each table entry including a type field and a pointer field, the type field indicating whether the table entry is used or free, the pointer field including a reference to a next free table entry if the table entry is free such that the data structure includes a list of free table entries linked using pointer fields, the apparatus comprising:
table entry processing logic configured to process the table entries sequentially and track the used and free table entries using a tracking structure, the tracking structure including a corresponding status field for each table entry, the status fields having an unmarked state and a marked state, such processing and tracking including marking the status fields corresponding to used table entries and marking the status fields corresponding to the next free table entries referenced in the pointer fields of free table entries; and
validation logic configured to determine validity of the data structure based on the tracking structure.

10. Apparatus according to claim 9, wherein the tracking structure includes at least one of:
a bitmap;
and array; and
a table.

11. Apparatus according to claim 9, wherein, for each table entry, the table entry processing logic is configured to:
determine whether the table entry is used or free based on the type field;
if the table entry is used and the corresponding status field in the tracking structure is marked, output an error indication indicating that the data structure is corrupted;
if the table entry is used and the corresponding status field in the tracking structure is unmarked, mark such status field in the tracking structure;
if the table entry is free and the status field corresponding to the next free table entry referenced in the pointer field of the table entry is marked, output an error indication indicating that the data structure is corrupted; and
if the table entry is free and the status field corresponding to the next free table entry referenced in the pointer field of the table entry is unmarked, mark such status field in the tracking structure.

12. Apparatus according to claim 11, wherein the validation logic is configured to output an error indication if the tracking structure includes any erroneous unmarked status entries after the sequential processing of the table entries by the table entry processing logic.

13. Apparatus according to claim 9, wherein the list of free table entries is non-circular.

14. Apparatus according to claim 9, wherein the list of free table entries is circular such that a last free table entry includes a reference to a first free table entry.

15. Apparatus according to claim 9, wherein the data structure includes a plurality of free table entries lists.

16. Apparatus according to claim 9, wherein the data structure is a filesystem indirection object.

17. A system providing for validation of a data structure, the data structure comprising a table having a sequence of table entries, each table entry including a type field and a pointer field, the type field indicating whether the table entry is used or free, the pointer field including a reference to a next free table entry if the table entry is free such that the data structure includes a list of free table entries linked using pointer fields, the system comprising:
a memory in which a tracking structure is maintained, the tracking structure including a corresponding status field for each table entry, the status fields having an unmarked state and a marked state; and
a validator configured to process the table entries sequentially and track the used and free table entries using the tracking structure, such processing and tracking including marking the status fields corresponding to used table entries and marking the status fields corresponding to the next free table entries referenced in the pointer fields of free table entries, the validator further configured to determine validity of the data structure based on the tracking structure.

18. A system according to claim 17, wherein the tracking structure includes at least one of:
a bitmap;
an array; and
a table.

19. A system according to claim 17, wherein, for each table entry, the validator is configured to:
determine whether the table entry is used or free based on the type field;
if the table entry is used and the corresponding status field in the tracking structure is marked, output an error indication indicating that the data structure is corrupted;
if the table entry is used and the corresponding status field in the tracking structure is unmarked, mark such status field in the tracking structure;
if the table entry is free and the status field corresponding to the next free table entry referenced in the pointer field of the table entry is marked, output an error indication indicating that the data structure is corrupted; and
if the table entry is free and the status field corresponding to the next free table entry referenced in the pointer field of the table entry is unmarked, mark such status field in the tracking structure.

20. A system according to claim 19, wherein the validator is further configured to output an error indication if the tracking structure includes any erroneous unmarked status entries after the sequential processing of the table entries by the table entry processing logic.

21. A system according to claim 17, wherein the list of free table entries is non-circular.

22. A system according to claim 17, wherein the list of free table entries is circular such that a last free table entry includes a reference to a first free table entry.

23. A system according to claim 17, wherein the data structure includes a plurality of free table entries lists.

24. A system according to claim 17, wherein the data structure is a filesystem indirection object.

* * * * *